United States Patent
Sung et al.

(10) Patent No.: US 7,489,646 B2
(45) Date of Patent: Feb. 10, 2009

(54) METHOD FOR TRANSMITTING AND RECEIVING DATA BI-DIRECTIONALLY DURING ALLOCATED TIME AND WIRELESS DEVICE USING THE SAME

(75) Inventors: Hyun-ah Sung, Seoul (KR); Dae-gyu Bae, Suwon-si (KR); Jin-woo Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 11/218,441

(22) Filed: Sep. 6, 2005

(65) Prior Publication Data

US 2006/0050709 A1  Mar. 9, 2006

(30) Foreign Application Priority Data

Sep. 3, 2004 (KR) .................. 10-2004-0070349

(51) Int. Cl.
*H04Q 7/20* (2006.01)
*H04J 3/16* (2006.01)
*H04J 3/24* (2006.01)

(52) U.S. Cl. .................. 370/280; 370/349; 370/469

(58) Field of Classification Search .......... 370/280, 370/349, 469
See application file for complete search history.

(56) References Cited

U.S. PATENT DOCUMENTS

| | | | | |
|---|---|---|---|---|
| 5,850,526 | A * | 12/1998 | Chou | 709/247 |
| 6,587,453 | B1 | 7/2003 | Romans et al. | |
| 7,009,960 | B2 * | 3/2006 | Ho | 370/347 |
| 2003/0135640 | A1 * | 7/2003 | Ho et al. | 709/237 |
| 2003/0169769 | A1 * | 9/2003 | Ho et al. | 370/473 |
| 2004/0022219 | A1 | 2/2004 | Mangold et al. | |
| 2004/0170194 | A1 * | 9/2004 | Moreton | 370/474 |
| 2005/0053066 | A1 * | 3/2005 | Famolari | 370/389 |
| 2005/0089000 | A1 * | 4/2005 | Bae et al. | 370/338 |
| 2005/0141548 | A1 * | 6/2005 | Koo et al. | 370/462 |

* cited by examiner

*Primary Examiner*—Alpus H Hsu
(74) *Attorney, Agent, or Firm*—Sughrue Mion, PLLC

(57) ABSTRACT

A method and device for bi-directionally transmitting and receiving data during an allocated time period are provided. The device includes a Physical Layer (PHY) module receiving a Medium Access Control (MAC) frame through a wireless medium, a MAC module reading a value of a first field in the received MAC frame, wherein the first field specifies whether there is more data to be sent, and a transmission rights determining module determining that a transmission right has been passed to the wireless device when the value of the first field is a first bit and a channel is idle during a predetermined threshold time after reception of the MAC frame, wherein the first bit represents that there is no more data to be sent.

14 Claims, 9 Drawing Sheets

METHOD FOR TRANSMITTING AND RECEIVING DATA BI-DIRECTIONALLY DURING ALLOCATED TIME AND WIRELESS DEVICE USING THE SAME

CROSS-REFERENCE TO RELATED APPLICATION

This application claims priority from Korean Patent Application No. 10-2004-0070349 filed on Sep. 3, 2004 in the Korean Intellectual Property Office, the disclosure of which is incorporated herein by reference in its entirety.

BACKGROUND OF THE INVENTION

1. Field of the Invention

The present invention relates to a method and apparatus for communication between wireless devices, and more particularly, to a method and apparatus for transceiving data bi-directionally between two wireless devices during allocated time.

2. Description of the Related Art

Ultra wideband (UWB), also known as digital pulse wireless, is a wireless communications technology for transmitting large amounts of digital data over a wide frequency band at very low power for a short distance. The technology was developed by the US Department of Defense for military purposes. The IEEE 802.15.3 Working Group for Wireless Personal Area Networks (WPANs) is developing a standard for UWB communications. While the IEEE 802.15.3 standard specifies Physical (PHY) and Medium Access Control (MAC) layers, industry research efforts are focusing more on improving the MAC layer.

The IEEE 802.15.3 MAC has the ability to join existing wireless networks rapidly. MAC is also based on an ad-hoc network called a "piconet", which is controlled by a Piconet Coordinator (PNC) instead of an Access Point (AP), and employs a Time Division Multiplexing Access (TDMA) method. FIG. 1 shows a conventional superframe format. A MAC frame used for data transmission and reception between devices is within a time-slotted superframe structure. Referring to FIG. 1, each superframe consists of a contention access period (CAP) interval during which data is transmitted using a beacon and a backoff algorithm, and a channel time allocation period (CTAP) interval during which data is transmitted without contention during allocated channel time. The CTAP may be replaced by a management CTA (MCTA). The CTAP uses Carrier Sense Multiple Access/Collision Avoidance (CSMA/CA) for contention-based channel access. The MCTA utilizes a Slotted Aloha for channel access.

The CTAP is composed of CTA blocks and MCTAs. There are two types of CTAs: dynamic CTAs and pseudo-static CTAs. In the case of the dynamic CTA whose position can change from superframe to superframe, if a device did not receive a beacon, it cannot use CTA in a superframe. Conversely, in the case of the pseudo-static CTA whose position is fixed in a superframe, CTA can be used as long as the number of consecutive lost beacons is less than mMaxLostBeacons. Since the IEEE 802.15.3 MAC is based on a TDMA that guarantees the Quality of Service (QoS), it is suitable for multimedia audio/video (A/V) streaming in a home network. However, MAC still has several problems that need to be solved in order to enhance throughput as well as QoS.

The IEEE 802.15.3 MAC supports two types of data transfer modes: isochronous and asynchronous.

FIG. 2 illustrates a conventional process of requesting CTA. Referring to FIG. 2, to transmit isochronous data, DEV 1 is assigned a CTA by a PNC using a MLME-CREATE-STREAM.request and a MLME-CREATE-STREAM.confirm. Then, DEV 1 transmits actual data during its allocated channel time using a MAC-ISOCH-DATA.request and a MAC-ISOCH-DATA.confirm.

The PNC informs a device in a piconet (hereinafter called a 'DEV') of allocated channel time by sending a beacon so that DEV can know the start and end times of communication.

The source device Src DEV and destination device Dest DEV are designated in the CTA information. In FIG. 2, DEV1 is a Src DEV and DEV2 is a Dest DEV. While only the Src DEV can transmit data during allocated channel time, the Dest DEV cannot necessarily receive the data. Only a DEV with an 'Always Awake' bit or 'listen to source' bit set to 1 can receive the data.

FIG. 3 illustrates a conventional process for transmitting asynchronous data. Referring to FIG. 3, once data to be transmitted arrives at a MAC layer using a MAC-ASYNC-DATA.request, DEV1 that is a Src DEV sends a channel time request command frame to a PNC. Then, after being informed through a beacon that its channel time request has been granted, the Src DEV sends data during the allocated channel time. Like isochronous data transfer, a pair of Src DEV and Dest DEV are designated in CTA information and only the designated Src DEV can transmit data during its allocated channel time. Also in FIG. 3, DEV 1 is Src DEV and DEV 2 is Dest DEV. Another method for transmitting asynchronous data is to send a frame using a backoff algorithm during a CAP.

In TCP/IP (Transmission Control Protocol/Internet Protocol), to ensure timely transmission of data, if DEV1 transmits a frame, DEV 2 sends an acknowledgement (ACK) frame (a TCP/IP ACK frame, not the immediate (Imm)-ACK frame shown in FIG. 2 or 3) to DEV 1. When a data transmission mechanism supported by the IEEE 802.15.3 MAC is used by the TCP/IP protocol, the following problems occur.

Firstly, isochronous TCP/IP data transfer will be described. To establish a connection between DEV 1 and DEV 2, DEV 1 requests a CTA, in which Src DEV is DEV1 and Dest DEV is DEV 2, from a PNC by sending a MLME-CREATE-STREAM.request to the PNC. When the PNC allocates channel time and sends a beacon carrying CTA information, DEV 1 reads the beacon and transmits a frame to DEV 2 during its allocated time. In order to send a response frame, DEV 2 requests CTA, in which Src DEV is DEV 2 and Dest DEV is DEV 1, from the PNC. Similarly, when the PNC allocates channel time and sends a beacon carrying CTA information, DEV 2 reads the information included in the beacon and transmits a response frame to DEV 1 during its allocated time.

Since channel time continues to be allocated until a MLME-TERMINATE-STREAM.request is received, subsequent data and ACK frames will be sent to DEV 1 and DEV 2 during time assigned to Src DEV and Dest DEV according to CTA information in a beacon. However, in TCP/IP, a sender never transmits a new frame until it receives an ACK frame for the previous data frame. On the other hand, the IEEE 802.15.3 MAC permits only a Src DEV designated in the CTA contained in the beacon to transmit data during its allocated channel time. Thus, DEV 2 has to wait a while until DEV 2 is designated as Src DEV, before sending a TCP/IP ACK frame. That is, DEV 1 cannot receive an ACK from DEV 2 during the remaining portion of the channel time (assigned to DEV 1 and DEV 2 after sending data), resulting in a waste of channel time.

Secondly, asynchronous data transfer will be described. When asynchronous data is transmitted in a CAP, a PNC may allocate a CAP in a superframe. Even if there is an allocated CAP, it is determined whether asynchronous data transfer is permissible during the CAP depending on criteria set by the PNC. Using CAP cannot guarantee the timely transmission of a TCP/IP frame. To send asynchronous data using CTA, DEV 1 uses a MAC-ASYNCH-DATA.request as described above. As illustrated in FIG. 3, DEV 1 has to send a channel time request command to the PNC and be allocated channel time by the PNC before transmitting each data frame. Thus, transmitting data consecutively leads to a waste of bandwidth. Furthermore, DEV 1 (requesting a CTA) cannot know when the requested time will be allocated so it has to wait until at least the beginning of the next superframe each time a data frame is sent. This leads to transmission delay.

The above problems may also be raised when a protocol other than TCP/IP resides above the IEEE 802.15.3 MAC.

SUMMARY OF THE INVENTION

Exemplary embodiments of the present invention provide a method for efficiently performing communication between two devices during allocated channel time by improving the IEEE 802.15.3 MAC. To accomplish this, channel time allocation (CTA) defined in the IEEE 802.15.3 is used for bidirectional transmission. That is, an exemplary embodiment of the present invention provides a method for efficiently supporting a bi-directional data transfer protocol such as Transmission Control Protocol (TCP) by using allocated channel time bidirectionally without making any change to the existing 802.15.3 MAC specification.

According to an aspect of the present invention, there is provided a wireless device including a Physical Layer (PHY) module receiving a MAC frame through a wireless medium, a MAC module reading a value of a first field in the received MAC frame, the first field specifying whether there is more data to be sent, a transmission rights determining module determining that a transmission right has been passed to the wireless device when the value of the first field is a first bit and a channel is idle during a predetermined threshold time after reception of the MAC frame, the first bit representing that there is no more data to be sent, and a control module that, when the transmission right has been passed to the device and there is data to be sent to another device that has sent the MAC frame, controls the operation of the MAC module and the PHY module to allow transmission of a MAC frame containing the data to be sent.

When the transmission right has been passed to the device and there is no more data to be sent to the other device that has sent the MAC frame, the control module may control the MAC module and the PHY module to allow transmission of a frame indicating that the transmission right is passed to the other device.

According to another aspect of the present invention, there is provided a method for bidirectionally transmitting and receiving data during allocated time, the method including receiving a Medium Access Control (MAC) frame through a wireless medium, reading a value of a first field in the received MAC frame, the first field specifying whether there is more data to be sent, determining that a transmission right has been passed when the first field set to a first bit and a channel is idle during a predetermined threshold time after reception of the MAC frame, the first bit representing that there is no more data to be sent, and when the transmission right has been passed and there is data to be sent to a device that has sent the MAC frame, transmitting a MAC frame containing the data to the device.

The first field may be a 'More data' field in a MAC header defined in the IEEE 802.15.3.

The threshold time may be longer than a retransmission interframe space (RIFS) defined in the IEEE 802.15.3.

In a feature of the present invention, when the transmission right has been passed and there is no more data to be sent to the device that has transmitted the MAC frame, the method may further include sending a frame indicating that the transmission right is passed to the device.

The frame indicating that the transmission right is passed to the other device may include only a MAC header with the first field set to the first bit.

The frame indicating that the transmission right is passed to the other device may use a No-ACK policy.

When an ACK policy of the received data frame is set to No-ACK, the threshold time may be 0.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

The IEEE 802.15.3 standard defines four different interframe spaces (IFSs): a minimum IFS (MIFS), a short IFS (SIFS), a backoff IFS (BIFS), and a retransmission IFS (RIFS).

The actual IFS (MIFS, SIFS, BIFS, and RIFS) values are determined by the characteristics of the physical layer. For example, when a 2.4 GHz physical layer is used, the IFSs are defined as shown in Table 1 below. Here, pPHYMIFSTime and pPHYSIFSTime respectively denote the time between successive frames and the receive-to-transmit (RX-to-TX) turnaround time. The PHY parameter pCCADetectTime denotes the clear channel assessment (CCA) detection time.

TABLE 1

| MAC Parameter | Corresponding PHY Parameter |
| --- | --- |
| MIPS | pPHYMIFSTime |
| SIFS | pPHYSIFSTime |

TABLE 1-continued

| MAC Parameter | Corresponding PHY Parameter |
|---|---|
| BIFS | pPHYSIFSTime + pCCADetectTime |
| RIFS | 2*pPHYSIFSTime + pCCADetectTime |

An Imm-ACK frame and a delay acknowledgement (Dly-ACK) frame are transmitted a SIFS after transmission of the previous frame requiring an ACK. The MIFS is used as allowed time between a frame with a No-ACK or Dly-ACK policy set and its successive frame. Meanwhile, when a source device (Src DEV) does not receive an Imm-ACK frame within a predetermined timeout period after sending a frame with an Imm-ACK policy set during a channel time allocation period (CTAP), the Src DEV re-transmits the same frame. The RIFS refers to a timeout period between transmission and retransmission of a frame.

Figure 4:
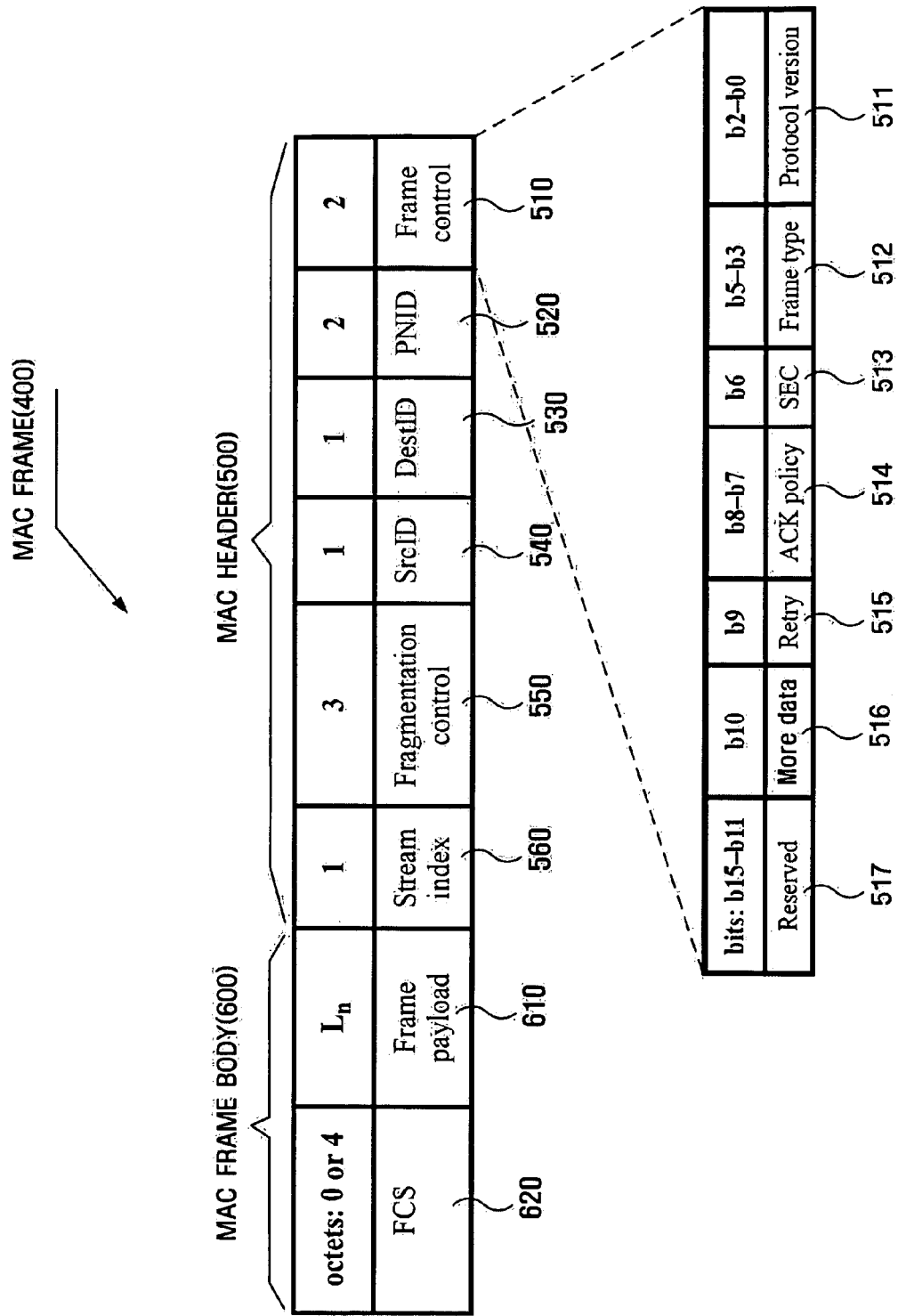
FIG. 4 illustrates a Medium Access Control (MAC) frame format defined in the IEEE 802.15.3 standard.

Referring to FIG. 4, a MAC frame 400 defined in the IEEE 802.15.3 consists of a MAC header 500 and a MAC frame body 600. Fields appear in the IEEE 802.15.3 MAC frame in order from right to left where the rightmost bit is transmitted first. The MAC frame 400 refers to a data frame, a control frame, an ACK frame, or another type of frame and includes a MAC header.

The MAC frame body 600 is composed of a variable length frame payload field 610 containing actual data and a frame check sequence (FCS) field used for checking an error of the MAC frame 400.

The MAC header 500 includes a frame control field 510, a PNID field 520 specifying a unique identifier for a piconet, a DestID field 530 specifying an ID of a DEV receiving the MAC frame 400, a SrcID field 540 specifying an ID of a DEV sending the MAC frame 400, a fragmentation control field 550 specifying information used to fragment and assemble a MAC Service Data Unit (MSDU), and a stream index field 560 specifying a stream index assigned by a piconet coordinator (PNC) for each CTA.

The frame control field 510 in the MAC header 500 is broken down into several subfields: a protocol version field 511 specifying a protocol version, a frame type field 512 identifying a frame type (beacon frame, ACK frame, command frame, or data frame), a SEC field 513 indicating whether the MAC frame 400 is encrypted, an ACK policy field 514 indicating the type of acknowledgement procedure for the MAC frame 400 to be transmitted, a retry field 515 specifying the number of retransmissions of a frame, a more data field 516, and a reserved field 517 reserved for future use.

The more data field 516 is used to indicate whether there is more data to be transmitted (that is, whether the current frame is the last frame). The more data field 516 is represented by 1 bit. When Src DEV decides not to use the channel time remaining in a CTA, i.e., when a frame to be transmitted is the last MAC frame, the more data field 516 is set to '0'. In all other frames, it is set to '1'. Alternatively, the more data field 516 may be set to '1' in the last MAC frame and to '0' in all other frames. While the former case applies throughout the specification, a bit used for the last MAC frame is referred to as a first bit in the claims while a bit used when there is more data to be transmitted is referred to as a second bit.

In the conventional IEEE 802.15.3 standard, a Dest DEV receiving a MAC frame with the more data field 516 set to '0' will switch into a power save mode since it has no more data to receive during the channel time remaining in an appropriate CTA. Conversely, the present invention allows a Src DEV transmitting a MAC frame with a more data field 516 set to '0' to wait a predetermined period of time before transmitting a new MAC frame to a Src DEV. In this way, the present invention enables a MAC protocol to support bi-directional CTA without any modification to some fields by using the more data field 516 in a different way than that defined in the conventional IEEE 802.15.3 standard. Hereinafter, a mode in which the Src DEV has the exclusive right to transmit is referred to as 'mode 1', while a mode in which the Dest DEV has the exclusive right to transmit is referred to as 'mode 2'. In the present invention, data can be transmitted alternately in mode 1 and mode 2 during a given CTA.

Figure 5:
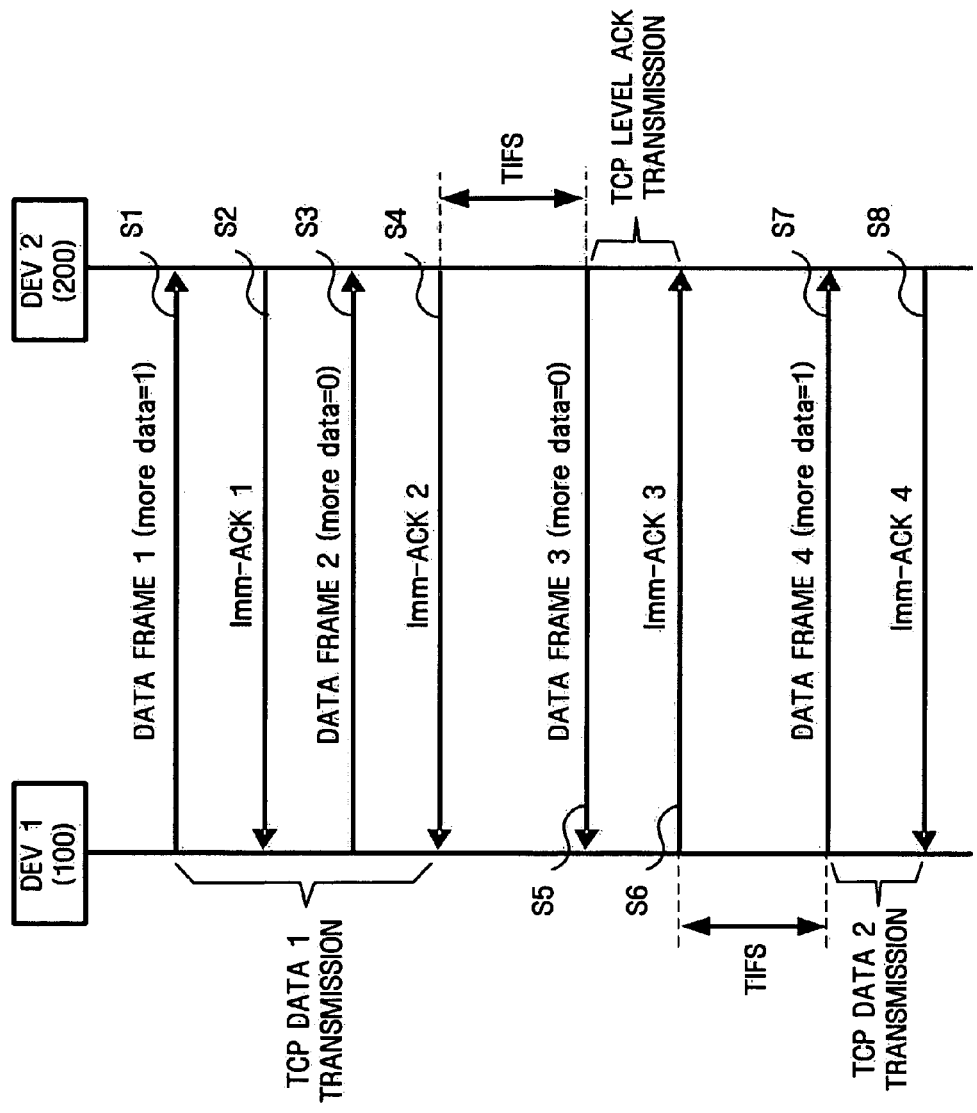
FIG. 5 shows an example of bi-directionally transmitting and receiving data between devices within allocated channel time according to an exemplary embodiment of the present invention.

FIG. 5 is a flowchart illustrating a data transfer process according to an exemplary embodiment of the present invention. DEV 1 100 (a Src DEV) may transmit data to DEV 2 200 (a Dest DEV) or another DEV within the same piconet in its allocated CTA. It is assumed that DEV 1 100 sends data in a layer above the MAC layer to DEV 2 200. This data is TCP data 1 and TCP data 2 shown in FIG. 5.

First, DEV 1 100 intends to transmit one of two data frames of TCP data 1 to DEV 2 200. In step S1, DEV 1 100 transmits data frame 1 with a more data field set to 1 to DEV 2 200. In step S2, if the data frame 1 uses an Imm-ACK policy, DEV 2 200 sends Imm-ACK 1 for the data frame 1.

In step S3, DEV 1 100 transmits data frame 2 with a more data field set to 0 to DEV 2 200. The more data field is set to 0 since DEV 1 100 has no more frames to send to DEV 2 200 or to another DEV within the same piconet.

In step S4, DEV 2 200 sends Imm-ACK 2 for the data frame 2. While an Imm-ACK policy is used in steps S1 through S4, a Dly-ACK policy may be used. If the Dly-ACK policy is used, step 2 may be skipped and in step S4, DEV 2 200 transmits a Dly-ACK to DEV 1 100.

DEV 2 200, which receives the data frame 2 with the more data field set to 0 from DEV 1 100, is granted the exclusive right to transmit data when a predetermined threshold time elapses after transmission of the Imm-ACK 2. In the exemplary embodiment of the present invention, as described above, a mode in which a Src DEV has the exclusive right to transmit data is defined as 'mode 1', while a mode in which a Dest DEV has the exclusive right to transmit data is defined as 'mode 2'.

The threshold time is defined as a two-way interframe space (TIFS). When the data frame 2 uses an Imm-ACK policy and has the more data field set to 0, DEV 2 200 waits a TIFS before transmitting a data frame even through DEV 1 100 has no more data to send. This is because DEV 1 100, which does not receive the Imm-ACK 2 from DEV 2 200, may attempt re-transmission of the data frame 2. Thus, when the Imm-ACK policy is used, a TIFS must be slightly longer than a RIFS, which is the amount of time required for DEV1 100 to transmit and re-transmit the data frame. In the present invention, a TIFS may be defined as: RIFS+pPHYSIFSTime.

While it is described above that DEV 2 200 waits a TIFS interval when the more data field is set to 0, and a data frame using a Imm-ACK or a Dly-ACK policy is received, DEV 2 200 may send a necessary data frame immediately after a SIFS interval when the more data field is set to 0 and a data frame using the No-ACK policy is received. In this case, since there is no possibility that DEV 1 100 will retransmit the data frame, DEV 2 200 only waits the RX-to-TX turnaround time, i.e., a SIFS interval.

In step S5, after waiting a TIFS or SIFS according to the ACK policy used, DEV 2 200, which has data to send to DEV 1 100, transmits a prepared frame, i.e., a TCP ACK frame, instead of entering a power save mode. The TCP ACK frame is indicated by data frame 3 because a MAC terminal recognizes the TCP ACK frame as MAC data. In this case, the TCP level ACK frame is sufficiently small enough to be transmitted as a single data frame 3. In this case, a more data field in a MAC header is set to 0. Subsequently, in step S6, DEV 1 100 sends an Imm-ACK 3 for data frame 3.

Since the received data frame 3 has a more data field set to 0, DEV 1 100 is granted the exclusive right to transmit data. In step S7, after waiting a TIFS (SIFS when the data frame 3 has an ACK policy set to No-ACK), DEV 1 100 sends data frame 4 to DEV 2 200. In step S8, DEV 1 100 receives an Imm-ACK 4 from DEV 2 200.

While it is described above that a DEV with the exclusive right to transmit has data to send, DEV may have no data to send. In this case, DEV passes the transmission right to a counterpart DEV by transmitting a frame including only a MAC header with a more data field set to 0 (hereinafter called a TOKEN frame).

The same process is repeated until there is no time remaining in the CTA.

Figure 6:
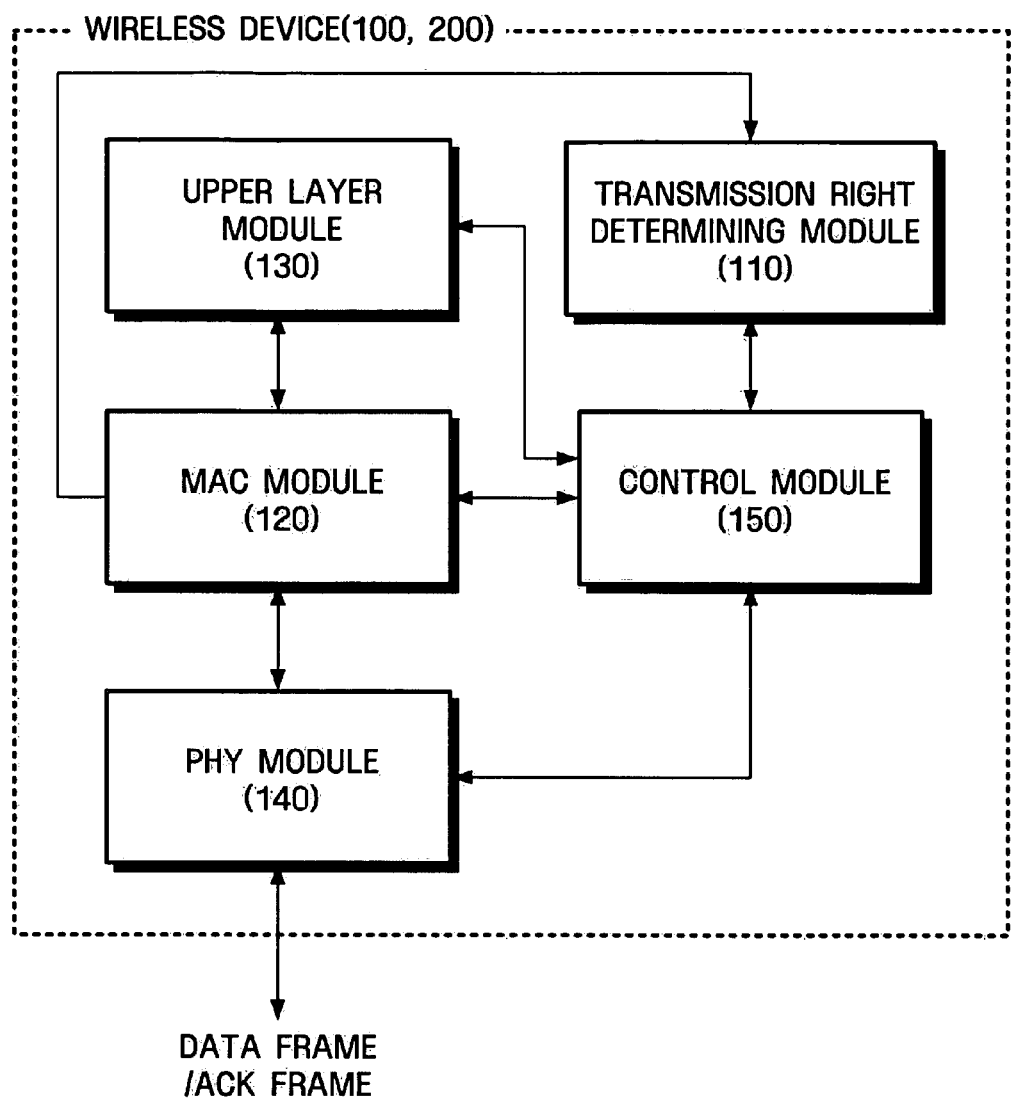
FIG. 6 is a block diagram of a wireless device according to an embodiment of the present invention.

FIG. 6 is a block diagram of a wireless DEV 100 (200) according to an exemplary embodiment of the present invention. Referring to FIG. 6, the wireless DEV 100 (200) includes a transmission rights determining module 110, a MAC module 120, an upper layer module 130, a PHY module 140, and a control module 150.

The transmission rights determining module 110 receives a value of more data field 516 read by the MAC module 120 and if the value of the more data field 516 is 0, indicating that the current data frame is the last data, determines whether a channel will be idle for a predetermined threshold time after the data frame is received from the PHY module 140. The transmission rights determining module 110 also informs the control module 150 of mode switching after the threshold time elapses when the channel is idle.

The MAC module 120 manages operation of the MAC layer. That is, the MAC module 120 receives an MSDU (frame payload 610 shown in FIG. 4) from the upper layer module 130, adds the MAC header (500 of FIG. 4) to the MSDU, and passes the resulting frame to the PHY module 140. The MAC module 120 also reads a MAC header in a data frame received from the PHY module 140, removes the MAC header from the data frame, and transmits the result to the upper layer module 130.

When the frame received from the PHY module 140 includes only a MAC header, for example, an Imm-ACK, the MAC module 120 does not transmit it to the upper layer module 130. The MAC module 120 also reads the value of the more data field 516 and transmits the value to the upper layer module 130.

The upper layer module 130 generates an MSDU and transmits the MSDU to the MAC module 120 while receiving data from which a MAC header has been removed from the MAC module 120. The upper layer module 130 manages a network layer (e.g., a TCP/IP layer) above a logical link control (LLC) layer.

The PHY module 140 manages operation of a Physical Layer. That is, the PHY module 140 receives a MAC Protocol Data Unit (MPDU) from the MAC module 120 to generate a Packet Protocol Data Unit (PPDU) and a radio signal containing the PPDU that are then transmitted to the MAC module 120. It also receives a signal through a wireless medium and processes the signal that is then transmitted to the MAC module 120. The PHY module 140 is subdivided into a base band processor and a radio frequency (RF) module.

The control module 150 controls the operation of other modules within the wireless DEV 100 (200) and may be implemented by a central processing unit (CPU), a microcomputer, or the like. When a transmission right is determined to have been passed to DEV 100 (200) by the transmission rights determining module 110, the control module 150 determines whether there is data, i.e., MSDU, to send and if there is pending MSDU, allows the MAC module 120 to generate a data frame by adding a MAC header to the MSDU. In this case, the more data field 516 is set to 0 when the data frame is the last frame to be transmitted, and it is set to 1 when the data frame is not the last one. Then, the data frame is transmitted to the other DEV 200 (100) through the PHY module 140.

On the other hand, when the transmission right is determined to have been passed to a DEV 100 (200) that has no more data to send, the control module 150 controls the MAC module 120 and the PHY module 140 to allow transmission of a TOKEN frame indicating that the transmission right is passed to another DEV 200 (100).

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

Figure 7:
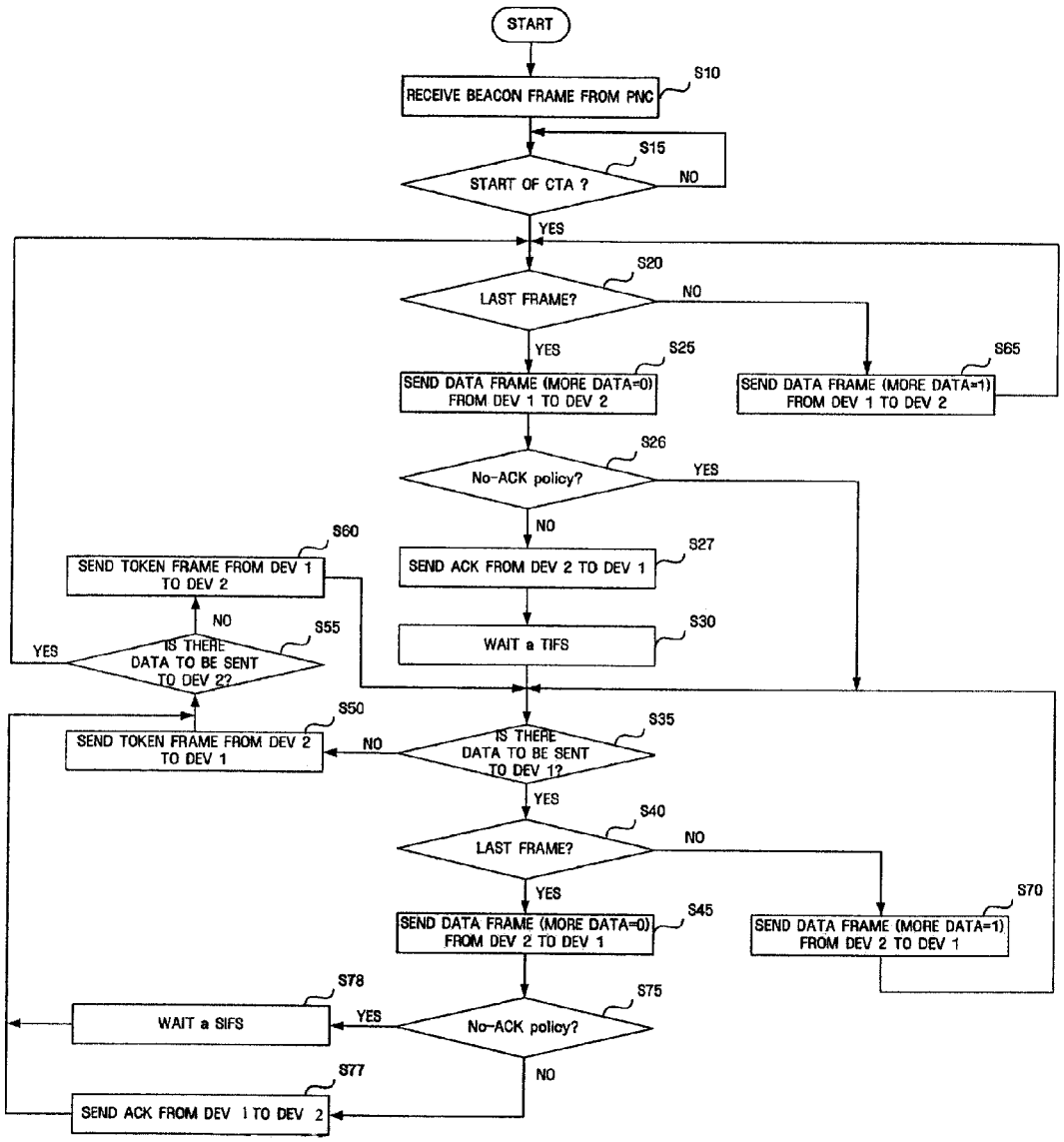
FIG. 7 is a flowchart illustrating the entire process of transmitting a data frame according to an exemplary embodiment of the present invention.

FIG. 7 is a flowchart illustrating the entire process of transmitting a data frame according to an exemplary embodiment of the present invention.

First, DEV 1 100 generates a command frame requesting channel time, i.e., a channel time request frame, and sends the channel time request frame to a PNC. The PNC generates a beacon frame using information contained in the channel time request frame and broadcasts the beacon frame to DEVs in the same piconet. Thus, in step S10, DEV 1 100 (a Src DEV) and DEV 2 200 (a Dest DEV) receive the beacon frame.

Figure 1:
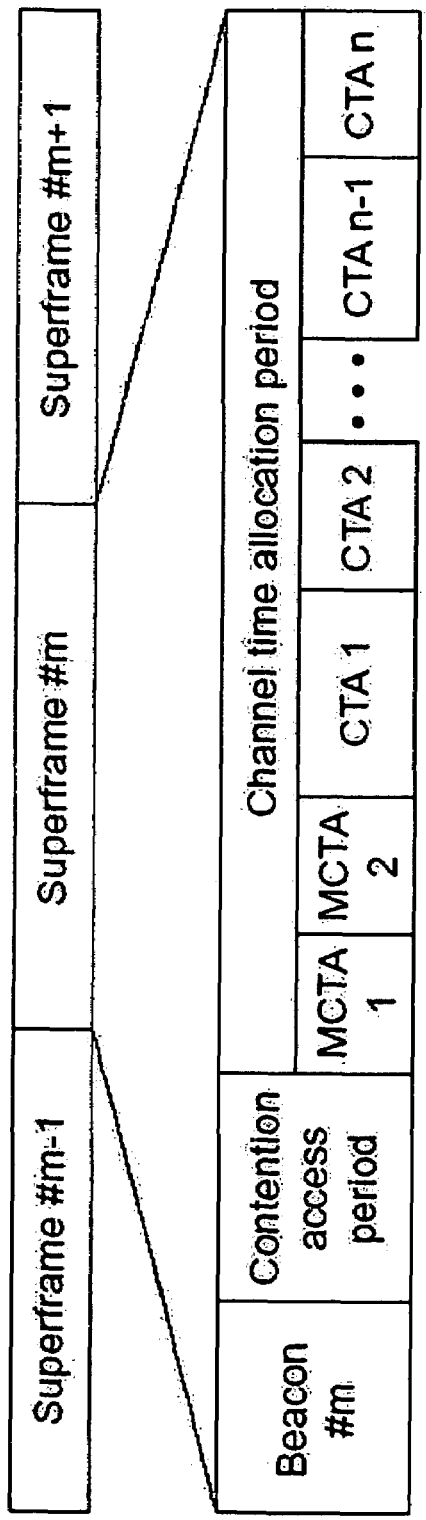
FIG. 1 illustrates a conventional superframe format.
Figure 2:
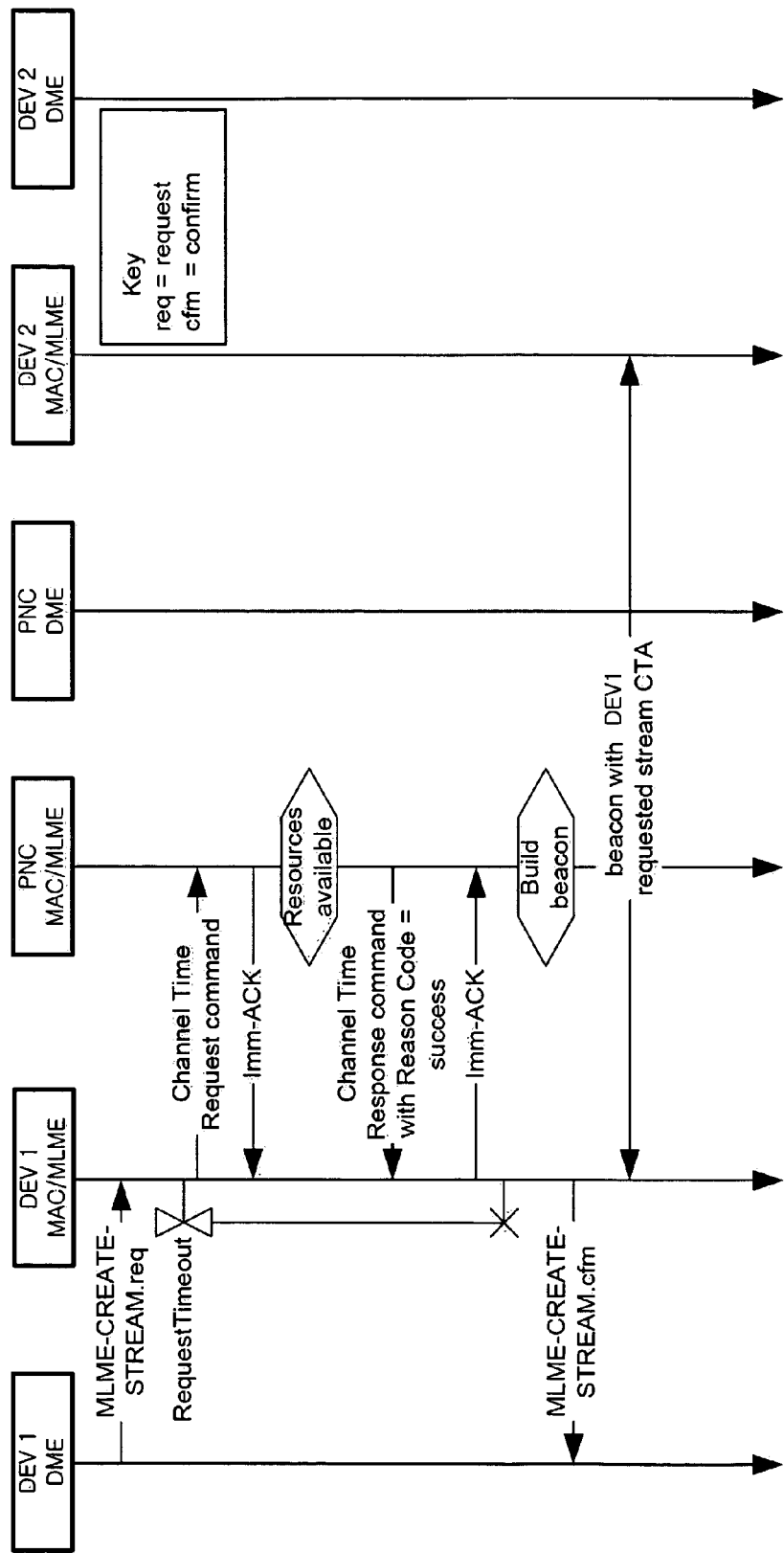
FIG. 2 illustrates a conventional process for requesting channel time allocation (CTA)
Figure 3:
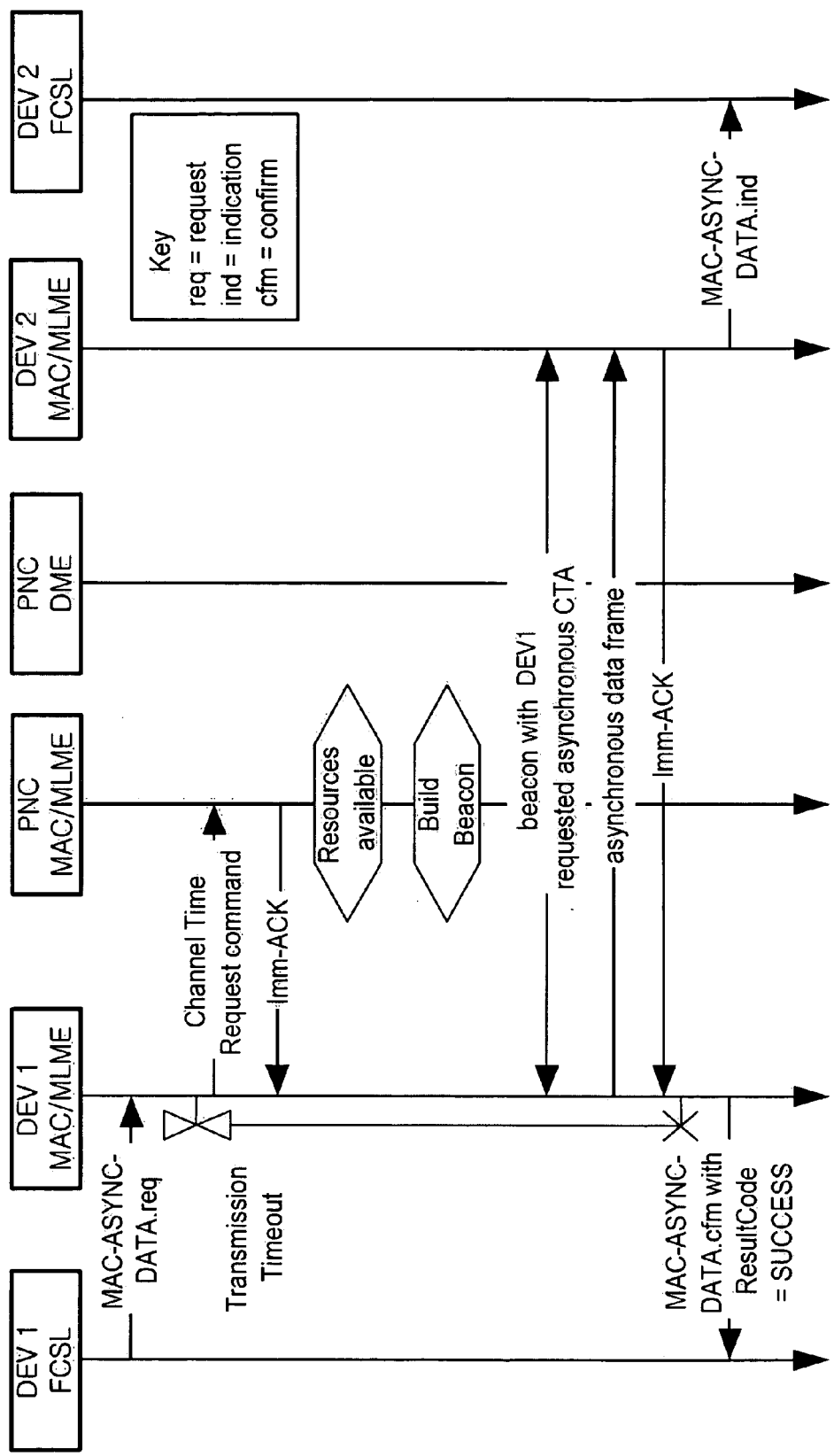
FIG. 3 illustrates a conventional process for transmitting asynchronous data.

As illustrated in FIG. 1, the beacon frame consists of at least one CTA block, and each block defines the start time and the duration of a CTA and IDs of a Src DEV (DEV 1 100, which sends data during a CTA) and a Dest DEV (DEV 2 200, which receives data during a CTA).

Upon arrival of the start time of CTA, during which DEV 1 100 communicates with DEV 2 200 (YES in step S15), DEV 1 100 sends a data frame to DEV 2 200. In this case, when the data frame is not the last frame (NO in step S20), DEV 1 100 sends the data frame having a MAC header 500 with a more data field 516 set to 1 in step S65. Then, the process returns to the step S20 in order to transmit the next data frame.

On the other hand, when the data frame is the last frame (YES in step S20), DEV 1 100 sends the data frame with the more data field 516 set to 0 in step S25. In step S26, DEV 2 200, which receives the data frame with the more data field 516 set to 0 from DEV 1 100, checks an ACK policy in the received data frame and, in step S27, sends an ACK (Imm-ACK or Dly-ACK) to DEV 1 100 if the ACK policy is not set to No-ACK (NO in step S26). In step S30, DEV 2 200 checks whether a channel is idle while waiting a TIFS after sending the ACK. Then, after the TIFS elapses and the channel is idle, DEV 2 200 is granted the exclusive right to transmit data to DEV 1 100. If there is re-transmission of the data frame from DEV 1 100 during the TIFS, DEV 2 200 re-transmits the ACK.

If the ACK policy is set to No-ACK (YES in step S26), DEV 2 200 has the exclusive right to transmit data to DEV 1 100 after receiving the data frame transmitted in step S25. Here, DEV 2 200 transmits a new data frame after at least a SIFS interval following reception of the data frame.

DEV 2 200 having the exclusive right to transmit is allowed to transmit data to DEV 1 100. In step S50, when there is no more data to be sent (NO in step S35), DEV 2 200 sends a TOKEN frame composed of only a MAC header with a more data field set to 0 to DEV 1 100. The TOKEN frame is used by DEV 2 200 to indicate that it has no more data to send to DEV 1 100. While the TOKEN frame may require an ACK, an ACK policy of the TOKEN frame may be set to No-ACK to reduce the amount of traffic in a channel. When the TOKEN frame has the No-ACK policy, DEV 2 200 immediately passes the transmission right to DEV 1 100 without waiting for a TIFS following the reception of a TOKEN frame.

In step S55, DEV 1 100, which has been granted the transmission right, determines whether there is data to be sent. If YES is the answer in step 55, the process returns to step S20. In step S55, if NO is the answer, DEV 1 100 sends a TOKEN frame with a more data field set to 0. The process returns to step S35 in order to proceed.

When there is data to be sent to DEV 1 100 in step 35, DEV 2 200 sends a data frame to DEV 1 100 in step S45 or S70. More specifically, in step S70, when the data frame is not the last frame (NO in step S40), DEV 2 200 sends a data frame with a more data field set to 1. The process returns to step S35 in order to transmit the next data frame. On the other hand, in step S45, when the frame is the last frame (YES is the answer in step S40), DEV 2 200 sends a data frame with a more data field set to 0 to DEV 1 100.

When the more data field in the data frame is set to 0, DEV 1 100 knows that it has the transmission right. After checking an ACK policy in the data frame to confirm that it is not set to No-ACK (NO in step S75), DEV 1 100 sends an ACK (Imm-ACK or Dly-ACK) to DEV 2 200 in step S77, and checks whether the channel is idle while waiting a TIFS following transmission of the ACK. The process returns to the step S55 after the TIFS elapses and the channel is idle.

When the ACK policy is set to No-ACK (YES in step S75), DEV 1 100 is granted the transmission right after receiving the data frame transmitted in step S45. Then, the process returns to step S55.

The steps S10 through S78 are performed until the end of the CTA. That is, at the end of the CTA, the process illustrated in FIG. 7 terminates.

A difference in transmission efficiency between unidirectional data transfer and bi-directional data transfer in a CTA will now be described with reference to FIGS. 8 and 9.

Figure 8:
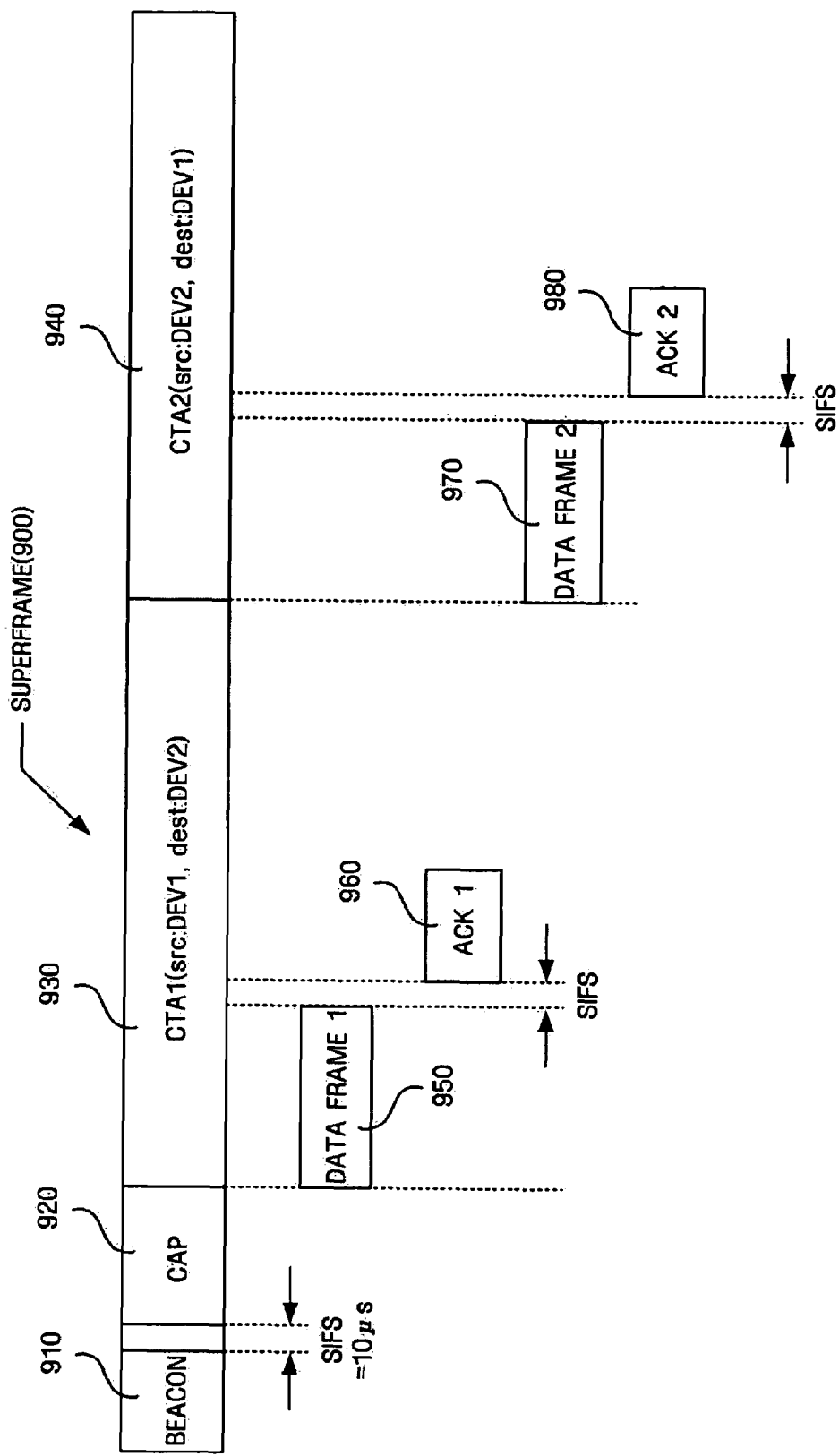
FIG. 8 illustrates a superframe format and a conventional unidirectional data transfer process.

FIG. 8 illustrates the format of a superframe 900 and a conventional unidirectional data transfer process. Referring to FIG. 8, a piconet contains two DEVs, DEV 1 and DEV 2; DEV 1 transmits a stream to DEV 2 using TCP/IP. DEV 1 sends a data frame to DEV 2 which then sends an ACK to DEV 1. It is assumed that the data frame has a MAC header with an ACK policy set to Imm-ACK, the durations of the superframe 900 and a CAP 920 are 10 ms and 1 ms, respectively, and transmission rates of the MAC header and a frame payload are 22 Mbps and 55 Mbps, respectively.

When DEV 1 and DEV 2 request a super-rate CTA with a rate factor field set to 1, the format of the superframe 900 is as illustrated in FIG. 8. As illustrated in FIG. 8, a beacon 910 is assumed to have no information elements (IEs) other than CTA IE and beacon service ID (BSID) IE.

The beacon 910 consists of a 10-byte MAC header, a 21-byte piconet sync parameter, a 16 byte CTA IE (for two CTA information), and a 20-byte BSID IE (BSID size is 10 bytes). As shown in the expressions below, about 0.012 ms is required to transmit the beacon 910.

$$\text{Header transmission time} = (10 \times 8 \text{ bits}) \times 1000 \text{ ms}/22 \text{ Mbps}$$
$$= 0.0036 \text{ ms}$$

$$\text{Payload transmission time} = (21 + 16 + 20) \times 8 \text{ bits} \times$$
$$1000 \text{ ms}/55 \text{ Mbps}$$
$$= 0.0082 \text{ ms}$$

The durations of CTA 1 930 and CTA 2 940 may vary depending on the number of time units (TUs) requested by DEV 1 and DEV 2 and the desired number of TUs. During one TU, at least one frame must be transmitted according to a specified ACK policy. When all time excluding beacon transmission time and a CAP 920 is allocated to DEV 1 and DEV 2, CTA 1 930, in which a Src DEV is DEV 1 and a Dest DEV is DEV 2, and CTA 2 930, in which a Src DEV is DEV 2 and a Dest DEV is DEV 1, are allocated to DEV 1 and DEV 2, respectively. It is assumed that DEV 1 and DEV 2 requested a super-rate CTA with a rate factor set to 1. The durations of CTA 1 930 and CTA2 940 may vary depending on the number of TUs requested by each DEV and the CTA algorithm performed by the PNC.

When CTA 1 930 starts, DEV 1 transmits data frame 1 to DEV 2. In this case, the payload of data frame 1 950 is a TCP/IP data frame. When data frame 1 950 is 2,048 bytes in length, which is the maximum length of a frame (excluding a MAC header), transmission time of the data frame 1 950 is about 0.3015 ms as shown below.

$$\text{MAC header transmission time} + \frac{(2048 \times 8 \text{ bits}) \times 1000 \text{ ms}/55 \text{ Mbps}}{} = 0.0036 \text{ ms} + 0.2979 \text{ ms}$$
$$= 0.3015 \text{ ms}$$

A MAC layer of DEV 2 sends ACK 1 960 to DEV 1 according to an ACK policy. Since an ACK frame in IEEE 802.15.3 contains only a MAC header, 0.0036 ms is required to transmit the ACK frame.

In the conventional data transfer, since a layer above the MAC layer sends data using TCP/IP, DEV 1 cannot send a new frame when it does not receive a TCP/IP level ACK frame from DEV 2. Thus, when DEV 1 sends a frame to DEV 1 using TCP/IP, DEV 2 must send an ACK frame for the frame. Since the ACK frame is sent by the layer above the MAC layer separately from an ACK (e.g., Imm-ACK) sent by the MAC layer, the MAC layer recognizes the ACK frame as another data frame. Data frame 2 970 in FIG. 8 represents a TCP/IP level ACK frame sent from DEV 2 to DEV 1. As illustrated in FIG. 8, when DEV 2 (designated as a Src DEV) intends to send the data frame 2 970 to DEV 1 it needs to wait up to the channel time. In other words, DEV 2 cannot send the data frame 2 970 until the CTA 2 940 starts. ACK 2 980 is a MAC level ACK frame sent according to an ACK policy at the MAC layer.

As described above, when a conventional CTA algorithm defined by IEEE 802.15.3 is used, a 2048 byte frame is sent from DEV 1 to DEV 2 and vice versa during a superframe of 10 ms.

Figure 9:
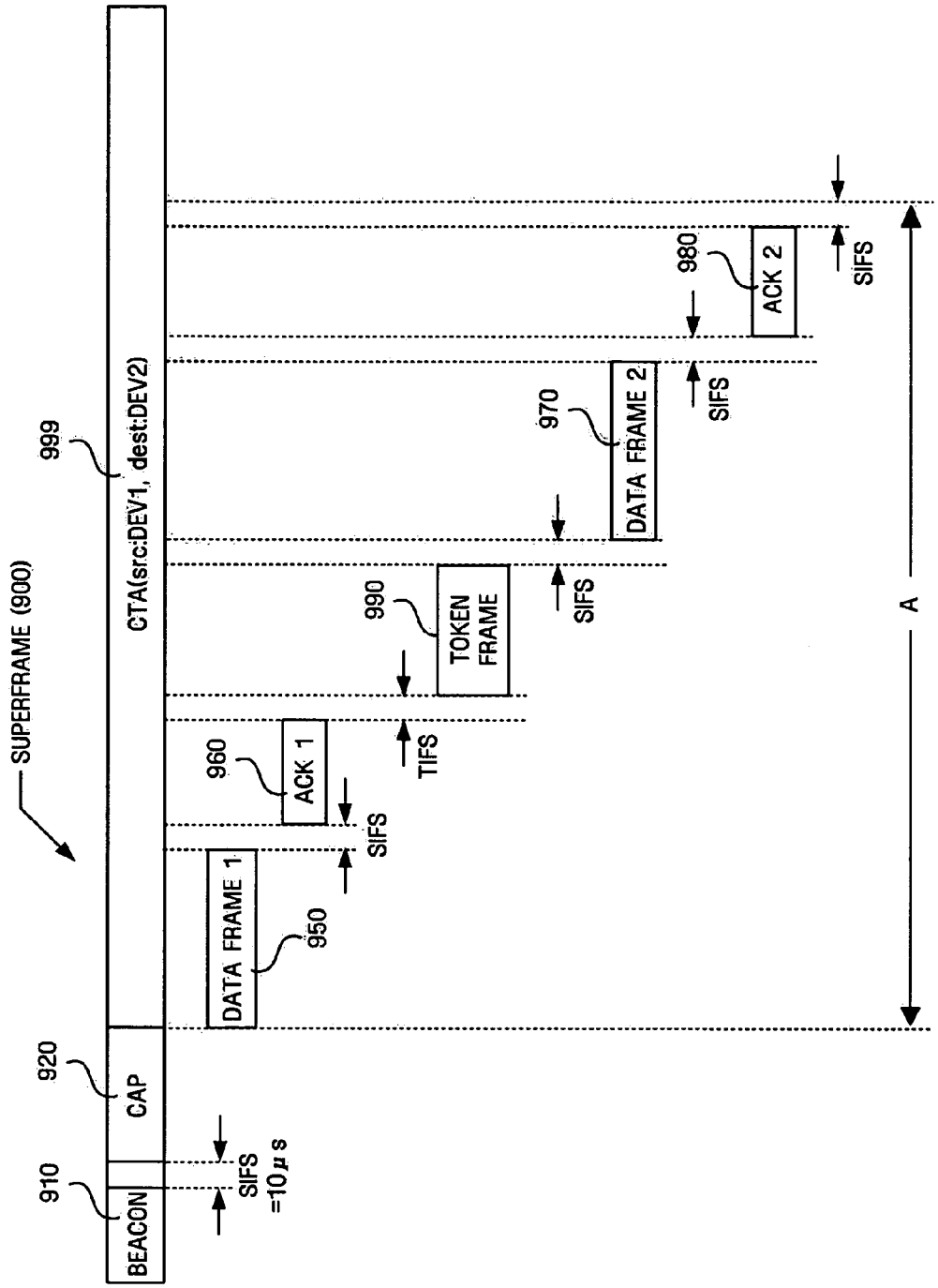
FIG. 9 illustrates a superframe format and a bi-directional data transfer process according to an exemplary embodiment of the present invention.

FIG. 9 illustrates a bi-directional data transfer process within a given CTA according to an exemplary embodiment of the present invention.

Like in the data transfer process illustrated in FIG. 8, it is assumed that all time, excluding beacon transmission time and a CAP 920, is allocated to DEV 1 and DEV 2. Data frame 1 950 is a TCP/IP data frame sent from DEV 1 to DEV 2, and data frame 2 970 is a TCP/IP level ACK frame sent from DEV 2 to DEV 1. Time A, the time required to send the TCP/IP data frame from DEV 1 to DEV 2 and receive the TCP/IP level ACK frame, is as shown in the following expression.

$$\begin{aligned}\text{Time } A &= \text{data frame 1 transmission time} + SIFS + ACK\ 1 \\ &\quad \text{transmission time} + TIFS + \text{TOKEN frame transmission} \\ &\quad \text{time} + SIFS + \text{data frame 2 transmission time} + SIFS + \\ &\quad ACK\ 2\ \text{transmission time} + SIFS \\ &= 0.3015\ \text{ms} + 0.01\ \text{ms} + 0.0036\ \text{ms} + 0.03\ \text{ms} + \\ &\quad 0.0036\ \text{ms} + 0.01\ \text{ms} + 0.3015\ \text{ms} + 0.01\ \text{ms} + \\ &\quad 0.0036\ \text{ms} + 0.01\ \text{ms} \\ &= 0.6838\ \text{ms}\end{aligned}$$

As shown in the expression below, the number of frames per superframe is obtained by dividing the time A by the transmission time of a beacon 910 plus the CAP 920 subtracted from a 10 ms superframe.

$$(10 - 0.012 - 0.01 - 1)/0.6838 \approx 13\ \text{frames}$$

DEV 1 can send thirteen 2048 byte frames to DEV 2 per superframe and vice versa. Of course, when the CTA with a rate factor field set to a value greater than 1 is requested, the conventional data transfer process shown in FIG. 8 enables transmission of a large amount of data. However, since arrangement of channel time may vary according to the rate factor or the CTA algorithm performed by a PNC, and since the use of maximum channel time cannot always be guaranteed, the bi-directional data transfer process within a given CTA according to an exemplary embodiment of the present invention is more efficient than the conventional data transfer process.

According to an exemplary embodiment of the present invention, bi-directional communication is allowed between two devices during a given CTA without modifying the existing MAC protocol defined in the IEEE 802.15.3 standard.

In addition, the method according to an exemplary embodiment of the present invention allows devices in a piconet to more efficiently use given CTAs, thereby improving the overall throughput of the piconet.

Although embodiments of the present invention have been described in detail in connection with certain exemplary embodiments, it should be understood that the invention is not limited to the disclosed exemplary embodiments, but it is intended to cover various modifications and/or equivalent arrangements included within the spirit and scope of the present invention, as defined in the appended claims.

What is claimed is:

1. A wireless device comprising:
   a Physical Layer (PHY) module for receiving a Medium Access Control (MAC) frame through a wireless medium;
   a MAC module for reading a value of a first field in the received MAC frame, wherein the first field specifies whether there is more data to be sent;
   a transmission rights determining module for determining that a transmission right has been passed to the wireless device if the value of the first field is a first bit and a channel is idle during a predetermined threshold time after reception of the MAC frame, wherein the first bit represents that there is no more data to be sent; and
   a control module that, if the transmission right has been passed to the wireless device and there is data to be sent to another device that has sent the MAC frame, controls the operation of the MAC module and the PHY module to allow transmission of a MAC second frame containing the data to be sent.

2. The device of claim 1, wherein the first field is a more data field in a MAC header defined by IEEE 802.15.3.

3. The device of claim 1, wherein the predetermined threshold time is longer than a retransmission interframe space (RIFS) defined by IEEE 802.15.3.

4. The device of claim 1, wherein, if the transmission right has been passed to the wireless device and there is no more data to be sent to said another device that has sent the MAC frame, the control module controls the MAC module and the PHY module to allow transmission of a frame indicating that the transmission right is passed to said another device.

5. The device of claim 4, wherein the frame indicating that the transmission right has been passed to said another device comprises only a MAC header with the first field set to the first bit.

6. The device of claim 5, wherein the frame indicating that the transmission right has been passed to said another device uses a no acknowledgement (No-ACK) policy.

7. The device of claim 1, wherein when an ACK policy of the received data frame is set to No-ACK, the threshold time is 0.

8. A method for bi-directionally transmitting and receiving data during an allocated time period, the method comprising:
   receiving a Medium Access Control (MAC) frame through a wireless medium;
   reading a value of a first field in the received MAC frame, the first field specifying whether there is more data to be sent;
   determining that a transmission right has been passed if the first field is set to a first bit and a channel is idle during a predetermined threshold time after reception of the MAC frame, wherein the first bit represents that there is no more data to be sent; and
   if the transmission right has been passed and there is data to be sent to a device that has sent the MAC frame, transmitting a second MAC frame containing the data to the device.

9. The method of claim 8, wherein the first field is a more data field in a MAC header defined by IEEE 802.15.3.

10. The method of claim 8, wherein the threshold time is longer than a retransmission interframe space (RIFS) defined by IEEE 802.15.3.

11. The method of claim 8, further comprising, if the transmission right has been passed and there is no more data to be sent to the device that has sent the MAC frame, sending a frame indicating that the transmission right has been passed to the device.

12. The method of claim 11, wherein the frame indicating that the transmission right has been passed to the device comprises only a MAC header with the first field set to the first bit.

13. The method of claim 12, wherein the frame indicating that the transmission right has been passed to the device uses a No-ACK policy.

14. The method of claim 8, wherein if an ACK policy of the received data frame is set to No-ACK, the threshold time is 0.

* * * * *